(12) United States Patent
Rydal et al.

(10) Patent No.: US 11,998,918 B2
(45) Date of Patent: Jun. 4, 2024

(54) BAG CONTAINING A REFERENCE FLUID

(71) Applicant: Radiometer Medical ApS, Brønshøj (DK)

(72) Inventors: Torben Rydal, Frederikssund (DK); Hans Peter Blaabjerg Jakobsen, Roedovre (DK)

(73) Assignee: Radiometer Medical ApS, Bronshoj (DK)

( * ) Notice: Subject to any disclaimer, the term of this patent is extended or adjusted under 35 U.S.C. 154(b) by 1224 days.

(21) Appl. No.: 16/499,487

(22) PCT Filed: Mar. 27, 2018

(86) PCT No.: PCT/EP2018/057707
§ 371 (c)(1),
(2) Date: Sep. 30, 2019

(87) PCT Pub. No.: WO2018/184902
PCT Pub. Date: Oct. 11, 2018

(65) Prior Publication Data
US 2020/0038853 A1    Feb. 6, 2020

(30) Foreign Application Priority Data

Apr. 3, 2017    (DK) .................... PA 2017 00230

(51) Int. Cl.
*B01L 3/00*    (2006.01)
*B32B 27/32*    (2006.01)

(52) U.S. Cl.
CPC ............... *B01L 3/505* (2013.01); *B01L 3/523* (2013.01); *B01L 2200/0689* (2013.01);
(Continued)

(58) Field of Classification Search
CPC .... B01L 3/505; B01L 3/523; B01L 2200/148; B32B 27/32; B32B 2307/7244; B32B 2439/46
See application file for complete search history.

(56) References Cited

U.S. PATENT DOCUMENTS

| | | | |
|---|---|---|---|
| 4,116,336 A | 9/1978 | Sorensen et al. | |
| 4,151,108 A | 4/1979 | Sorensen et al. | |

(Continued)

FOREIGN PATENT DOCUMENTS

| | | |
|---|---|---|
| CN | 1095990 A | 12/1994 |
| CN | 1535127 A | 10/2004 |

(Continued)

OTHER PUBLICATIONS

English Translation of JP 2007 290269 (Dainippion Printing Co Ltd), epo.org, Sep. 30, 2022 (Year: 2022).*

(Continued)

*Primary Examiner* — Vishal Pancholi
*Assistant Examiner* — Robert K Nichols, II
(74) *Attorney, Agent, or Firm* — FINNEGAN, HENDERSON, FARABOW, GARRETT & DUNNER, LLP

(57) ABSTRACT

The invention relates to a sealed bag containing a reference fluid for the calibration or quality control of a sensor element for measuring body fluid parameters, the bag comprising peripheral walls of a first layered material. The bag further comprises an access port formed by an opening in the first layered material, wherein the opening is sealed by a cover of a second layered material, wherein the second layered material is more resistant to oxidation by the reference fluid than the first layered material.

31 Claims, 4 Drawing Sheets

(52) U.S. Cl.
CPC ......... *B01L 2200/148* (2013.01); *B32B 27/32* (2013.01); *B32B 2307/7244* (2013.01); *B32B 2439/46* (2013.01)

(56) References Cited

U.S. PATENT DOCUMENTS

| | | | |
|---|---|---|---|
| 5,425,583 A * | 6/1995 | Wild | B65D 75/58 383/202 |
| 5,763,028 A * | 6/1998 | Matsumoto | B32B 27/08 426/127 |
| 5,830,545 A | 11/1998 | Frisk | |
| 9,101,936 B2 | 8/2015 | Marcher et al. | |
| 2004/0161177 A1 | 8/2004 | N'Dia | |
| 2007/0274869 A1 | 11/2007 | Rannikko et al. | |
| 2009/0022985 A1 | 1/2009 | Smith et al. | |
| 2015/0126349 A1 * | 5/2015 | Ishihara | B65D 33/02 493/203 |

FOREIGN PATENT DOCUMENTS

| | | |
|---|---|---|
| CN | 101688860 A | 3/2010 |
| CN | 105026150 A | 11/2015 |
| CN | 106255590 A | 12/2016 |
| EP | 0 007 685 A1 | 2/1980 |
| EP | 0 874 732 B1 | 11/1998 |
| EP | 2 644 273 A2 | 10/2013 |
| EP | 3 181 354 A1 | 6/2017 |
| JP | 59-164431 | 9/1984 |
| JP | 61-228864 | 10/1986 |
| JP | H03146068 A | 6/1991 |
| JP | 2000-512677 | 9/2000 |
| JP | 2007-290269 | 11/2007 |
| JP | 2010-525339 | 7/2010 |
| WO | WO 97/08561 | 3/1997 |
| WO | WO 97/44249 | 11/1997 |
| WO | WO 2008/131768 | 11/2008 |
| WO | WO 2010/031026 | 3/2010 |

OTHER PUBLICATIONS

International Search Report for International Application No. PCT/EP2018/057707, dated Jun. 26, 2018 (four pages).
Written Opinion of the International Searching Authority for International Application No. PCT/EP2018/057707 (six pages).
"High Purity Metal Material," Tian Qinghua Metallurgical Industry Press (2010) (four pages).

* cited by examiner

BAG CONTAINING A REFERENCE FLUID

This application is a national stage filing under 35 U.S.C. § 371 of International Application No. PCT/EP2018/057707, filed on Mar. 27, 2018, which claims priority of Danish Patent Application No. PA 2017 00230, filed on Apr. 3, 2017. The contents of these applications are each incorporated herein by reference.

The present invention relates in one aspect to a sealed bag containing a reference fluid for the calibration or quality control of a sensor element for measuring body fluid parameters, the bag comprising peripheral walls of a first layered material, in particular a sealed bag that is adapted for being pierced by an access probe for withdrawal of the reference fluid.

According to a further aspect, the sealed bag contains a reference fluid for the calibration or quality control of an amperometric sensor, in particular a high-sensitivity amperometric sensor.

According to a specific aspect, the sealed bag contains a reference fluid for the calibration or quality control of a creatine and/or creatinine sensor.

Further according to a specific aspect, the sealed bag contains a reference fluid for the calibration or quality control of a glucose sensor, in particular a high-sensitivity amperometric glucose sensor.

Further according to a specific aspect, the sealed bag contains a reference fluid for the calibration or quality control of a lactate sensor, in particular a high-sensitivity amperometric lactate sensor.

In another aspect, the invention relates to a bag assembly comprising such a sealed bag containing a reference fluid. In a further aspect, the invention relates to a container adapted for providing an analysis instrument for measuring parameters of a body fluid with a plurality of reference fluids for sensor calibration and/or sensor quality control.

BACKGROUND OF THE INVENTION

Bags for reference fluids are widely used in connection with analytical instruments. The bags are frequently delivered in containers, e.g. a cassette, wherein several bags are delivered in one cassette. A single cassette may comprise several different reference fluids depending on the analytical instrument for which the cassette is adapted to deliver reference fluids to. The analytical instrument may be an instrument for measuring on body fluids, such as blood or urine. Typical parameters measured on body fluids are, for example, $pCO_2$, $pO_2$, pH, $Na^+$, $K^+$, $Ca^{2+}$, $Cl^-$, glucose, lactate, urea, creatinine, bilirubin and haemoglobin values, such as $FO_2Hb$, FCOHb, FMetHb, FHHb and FHbF. The parameters are usually measured by means of sensors and each parameter normally requires a specific sensor. However, to provide reliable results, the quality of the measurements provided by the sensors has to be controlled frequently and the sensors have to be calibrated even more often. The calibration and quality control procedures are carried out using reference fluids, which may be gaseous or liquid, and the processes of calibration and quality control are well-known to the skilled person.

Particularly advantageous embodiments of instruments for measuring body fluid parameters employ a sample chamber with a very small sample volume with a plurality of dedicated sensors integrated in the side walls of the sample chamber. Sensor cartridges with multiple sensors are, for example, known from U.S. Pat. Nos. 5,916,425 and 8,728,288. Such multiple sensor devices allow for the simultaneous measurement of multiple of the above-mentioned parameters on the same sample, thereby significantly reducing the required amount of sample fluid while providing a more comprehensive picture of the state of a patient. However, amongst other challenges this also significantly tightens the requirements and constraints for the calibration and quality control procedures. For example, the inclusion of a particularly sensitive amperometric sensor in the multiple sensor device may both require the addition of a further analyte to a given reference fluid composition and at the same time impose more restrictive tolerances on a different analyte in the reference fluid. Accordingly, the tolerances for the specified content of reference analytes in the reference fluids are tightened.

In the light of the above, it is therefore of the utmost importance that a bag containing a reference fluid is well sealed and made of a material that is adequately fluid tight. This is even the more relevant with respect to gases, such as carbon dioxide, nitrogen, and in particular oxygen.

A sealed bag optimized for a reference fluid with calibrated oxygen content, amongst others, is e.g. disclosed in U.S. Pat. No. 9,101,936, which is hereby incorporated by reference in its entirety. This bag is made of a layered material with an inner polymer in contact with the reference fluid, an outer polymer layer, and a gas diffusion barrier layer made of aluminium arranged between the inner and outer layers. A disadvantage of using aluminium as a barrier layer in a bag for reference fluids is that pristine aluminium when exposed to an aqueous solution will undergo a corrosion reaction thereby producing hydrogen released into the reference fluid. However, hydrogen released into the reference fluid may interfere with measurements of electrochemical sensors, such as amperometric measurements. This may cause artefacts affecting the calibration and quality control procedures.

The issue of parasitic hydrogen generation, due to corrosion of an aluminium gas diffusion barrier layer, has been addressed in co-pending applications, DK 2015/00805, EP 16203151, and U.S. Ser. No. 15/378,247, disclosing a sealed bag containing a reference fluid for the calibration or quality control of creatine and/or creatinine sensors. This bag is made of a layered material with an inner polymer in contact with the reference fluid, an outer polymer layer, and one or more additional core layers in between. In particular, the core layers may include a few nanometres thin aluminium-oxide layer, which is typically supported on a polymer carrier layer. Thereby, the issue of parasitic hydrogen generation is solved while maintaining surprisingly low gas diffusion. However, despite the surprising low gas diffusion through this aluminium oxide based layered material, which is more than adequate for most applications, it may not completely live up to the gas tightness of the above-mentioned layered material comprising an aluminium layer as a gas diffusion barrier. Accordingly, such a bag may be optimized for minimizing or even completely avoiding the issue of parasitic hydrogen generation. However, in particular in the context of multiple sensor devices, such as the ones mentioned above, reference fluid compositions with multiple analytes may be desirable, which call for both a highly reliable gas diffusion barrier and which at the same time are sensitive with respect to parasitic hydrogen generation.

Therefore there still is a need for a sealed bag containing a reference fluid for the calibration or quality control of sensors for measuring body fluid parameters, which overcomes or at least significantly reduces the issue of parasitic hydrogengeneration and exhibits improved gas tightness.

Object of the present invention is therefore to provide a sealed bag adapted for being pierced by an access probe for the withdrawal of a reference fluid contained in the bag, which overcomes at least some of the above-mentioned problems of the prior art.

SUMMARY OF THE INVENTION

The object of the invention is achieved by a sealed bag according to independent claim 1 with advantageous embodiments as defined by the dependent claims as well as any further embodiments derivable from the following description.

The term "sealed" is to be understood as meaning there is substantially no fluid communication between the interior and exterior of the bag. In other words, it is not possible for liquid to escape from or enter the bag.

Calibration of a sensor is to be understood as an experimental determination of the correspondence between sensor responses and predetermined parameter values of a reference material. The correspondence determined in the calibration is then used when a parameter in, for example, a physiological fluid is to be determined. First, a sensor response to the physiological parameter is obtained. Then, the sensor response is converted into a measured parameter value by using the correspondence determined. According to some embodiments of the invention, the parameter to be determined is the creatine and/or creatinine level in, for example a physiological fluid. Further according to some embodiments of the invention, the parameter to be determined is the glucose level in, for example a physiological fluid. Further according to some embodiments of the invention, the parameter to be determined is the lactate level in, for example a physiological fluid.

Quality control of a sensor is to be understood as the experimental verification that the sensor measurements are accurate and/or precise. Usually, such verification is performed by determining whether a measured parameter value of a reference material is within an acceptance range. The measured parameter value of the reference material is obtained by converting the sensor response into the measured parameter value using a calibration correspondence as described above. It is then determined whether the measured parameter value is within the acceptance range of the reference material.

The acceptance range is generally centred on a predetermined value. The limits of the range depend, for example, on sensor variation, on the variation when determining the predetermined parameter value of the reference material for both the quality control and the calibration and/or on demands of accuracy and precision.

According to a first aspect of the invention a sealed bag is provided, wherein the sealed bag contains a reference fluid for the calibration or quality control of a sensor element for measuring body fluid parameters, the bag comprising peripheral walls of a first layered material, wherein the bag further comprises an access port formed by an opening in the first layered material, wherein the opening is sealed by a cover of a second layered material, wherein the second layered material is more resistant to oxidation by the reference fluid than the first layered material.

Advantageously according to some embodiments, the reference fluid is for the calibration or quality control of at least one electrochemical sensor element for measuring body fluid parameters, in particular at least one electrochemical sensor with an ion-selective membrane. Further advantageously, the reference fluid is for the calibration or quality control of a creatine and/or creatinine sensor. Further advantageously, the reference fluid is for the calibration or quality control of a glucose sensor. Further advantageously, the reference fluid is for the calibration or quality control of a lactate sensor. Such reference fluids are aqueous solutions of analytes. Multiple analytes may be provided in the same reference fluid. The same analytes may be provided in different reference fluids, and may be provided at different concentrations. The reference fluids are provided with a calibrated composition, i.e. with a content of analytes at meticulously calibrated concentrations.

The reference fluid comprises at least one component selected from the group consisting of $CO_2$, $O_2$, $K^+$, $Na^+$, $Ca^{2+}$, $Cl^-$, glucose, lactate, haemoglobin, creatinine, creatine and urea. Preferably, the reference fluid comprises at least creatine and/or creatinine. Further preferably, the reference fluid comprises at least glucose. Preferably, the reference fluid comprises at least lactate.

The reference fluid may further comprise biological buffers, salts, enzymes, surfactants, chelators, antibiotics and preservatives.

The sealed bag has peripheral walls with an opening sealed by a cover. The sealed bag is flexible. The sealed bag contains the reference fluid.

An inner chamber of the bag is defined by the peripheral walls made of the first layered material. The inner chamber contains the reference liquid. The access port is formed in the peripheral walls by providing an opening in the first layered material. The opening defines an access location for an access probe. The access probe is adapted to pierce the cover that seals the opening, thereby providing a passage from the inside of the bag to the outside of the bag to withdraw the reference fluid from the bag. When the sealed bag is connected to an analysis instrument the reference fluid may then be provided to the instrument for performing a calibration or quality control procedure. As mentioned below, a bag assembly may comprise a sealed bag and an access probe adapted to pierce the sealed bag at an access location for withdrawing the reference fluid. As further mentioned below, the sealed bag is typically for use in an analysis instrument using a cassette-based reference fluid system.

The opening is located, shaped and dimensioned to yield access for the access probe passing through the opening without breaking, scoring, or otherwise damaging the first layered material. The opening may be located at a predefined access location, aligned with respect to a pre-defined location of deployment of a cooperating access probe. The diameter of the opening should then be dimensioned to account for alignment tolerances during production and assembly of the bag, as well as for alignment tolerances between the access location on the bag and the deployment location of the access probe, when the bag is installed for use. For example, an access probe may have a transverse dimension of a few millimetres, such as between 1-4 mm, such as between 2-3 mm. The corresponding opening in the bag may then be dimensioned to between 5-15 mm, such as between 7-13 mm, such as about 10 mm. Thereby, it is achieved that any direct contact of the reference fluid with the internal layers of the first layered material can be prevented when the bag is perforated by an access probe for withdrawing the reference fluid.

The opening is sealed with a cover made of a second layered material different from the first layered material. The bag is thus sealed during a storage period including transportation to and installation at the point of use, i.e. until an access probe pierces the cover for withdrawal of the reference fluid. The first layered material forming the bag may be designed for a number of certain criteria and/or may be adapted to fulfil certain constraints or requirements, such as certain barrier values for the diffusion of analytes there through, purity requirements, or mechanical stability. However, fulfillment of such design criteria may require the inclusion of materials, which are prone to corrosion when brought in contact with the reference fluid. Contact between such materials causing an oxidation reaction result in the generation of parasitic hydrogen released into the reference fluid, thereby affecting, if not completely corrupting, the calibration and quality control procedures as discussed above. During a storage period, the contact between such materials and the reference fluid may be prevented by lining the inner chamber with an appropriate material. However, at least when accessing the inner chamber by piercing the peripheral wall of the bag, the layered material is ripped open and such critical materials may be exposed to the reference fluid. By providing a cover of a different layered material than that of the peripheral walls it is possible to define an access location on the sealed bag that is adapted for low hydrogen generation upon perforation of the cover, whereas the peripheral walls may be adapted to fulfil other principal design criteria, such as an improved mechanical stability, or maximum fluid tightness, in particular low gas diffusion through the material. By limiting the access location to a pre-defined small opening, such as indicated above, it is possible to have less restrictive constraints on the second layered material as regards e.g. upper limits for the gas diffusion there through, or for the mechanical stability of the cover material than if the entire bag was made of the second layered material.

Instead of breaking through the first layered material when the sealed bag with reference fluid is activated for use, the access probe perforates the cover made of the second layered material. When withdrawing the reference fluid from the bag, the one or more layers of the second layered material, including any core layers, may thus be exposed to the reference fluid. By requiring that the second layered material is more resistant to oxidation by the reference fluid than the first layered material when exposed to the environment of the reference fluid, it is achieved that parasitic hydrogen generation stemming from an oxidation reaction of the reference fluid with the pierced membrane material sealing the bag is successfully reduced, if not completely prevented. Advantageously, the second layered material is different from the first layered material in that any of the layers in the second layered material is more resistant to oxidation by an aqueous reference fluid than the layer or layers in the first layered material that are most susceptible for oxidation when exposed to the reference fluid. Most preferably, the second layered material differs from the first layered material in that it does not comprise any layers of materials that can be corroded by the aqueous reference solutions commonly used for calibration or quality control of body fluid parameter sensors, i.e. the second layered material does not contain any materials that are prone to undergo an oxidation reaction when brought in contact with the reference fluid. In particular, the second layered material preferably does not comprise a metallic layer, apart from noble metals that are not corroded by the reference solution, such as gold. In particular, the second layered material preferably does not comprise a metallic layer made of aluminium.

Further according to some embodiments of the sealed bag, the first layered material comprises an inner polymer layer in contact with the reference fluid, an outer polymer layer, and a gas barrier layer between the inner and outer polymer layers. The inner polymer layer is for contacting the reference fluid. The gas barrier layer is for suppressing gas diffusion in either direction through the peripheral walls. The outer polymer layer adds mechanical stability to the peripheral walls of the bag, and in particular protects the gas barrier layer from mechanical damage due to external influences. The inner polymer layer may have a thickness of from 70 to 90 μm, preferably 75 to 85 μm. The outer polymer layer may be any suitable polymer. Examples of suitable polymers include polyolefin, polyester, polyurethane, polycarbonate and polyamide. Preferably, the outer polymer layer is bi-axially orientated. Preferably, the outer polymer layer is bi-axially orientated polyamide. The thickness of the outer polymer layer may be from 10 to 20 μm, preferably 12 to 18 μm. The inclusion of this layer ensures proper mechanical stability of the bag.

Advantageously according to some embodiments the thickness of the gas barrier layer of the first layered material is between 5-15 μm, or between 8-12 μm, or about 9 μm. Thereby a good suppression of gas diffusion through the peripheral walls of the sealed bag is achieved.

Further according to some embodiments of the sealed bag, the gas barrier layer of the first layered material is made of a metal, preferably aluminium. Thereby, a very good gas barrier with very low diffusion of relevant analyte gases, such as oxygen, there through is provided.

Further according to some embodiments of the sealed bag, the inner layer of the first layered material is made of a heat-sealable material, such as polypropylene or polyethylene. Preferably, the inner layer of the first layered material is made of polyethylene. Thereby a sealed bag can be formed using heat sealing techniques to reliably achieve a fluid tight and mechanically stable seam for joining adjacent web portions. Preferably, the heat-sealable material of the inner layer has a melting temperature below the remaining layers of the first layered material. Advantageously, the outer polymer layer of the first layered material is made of polyethylene terephthalate or polyamide.

Advantageously according to some embodiments of the sealed bag, the second layered material comprises at least a first polymer layer on a first side thereof and a second polymer layer on a second side thereof. By providing at least a first polymer layer forming a first face of the layered material and a second polymer layer forming a second face of the second layered material opposite to the first face, the outside properties of the cover may be tailored to match the needs for compatibility of the side facing the inside of the bag with the reference fluid, and further to match the needs for attaching the cover to the peripheral walls around the opening and for forming a proper seal with the first layered material. Further advantageously, the second layered material comprises at least one gas barrier layer. Thereby the gas diffusion through the cover is further reduced. Preferably, the at least one gas barrier layer of the second layered material is made of a non-oxidising material in the environment of the reference fluid. The limitation to a non-oxidising material avoids parasitic hydrogen generation by reference fluid contacting the internal layers of the cover when this is breached by an access probe for withdrawing the reference fluid.

Further according to some embodiments of the sealed bag, the second layered material comprises at least a first polymer layer, a second polymer layer, and a first gas barrier layer between the first and second polymer layers. Thereby the gas diffusion through the cover is further reduced.

Furthermore, by placing the gas barrier layer between two polymer layers, the gas barrier layer is protected from external influences.

Further according to some embodiments of the sealed bag, the first gas barrier layer of the second layered material is made of aluminium oxide or silicon oxide, preferably aluminium oxide. These materials provide a surprisingly good gas diffusion barrier for use with reference fluids and are resistant to corrosion/oxidation by the aqueous reference solutions commonly used for the calibration or quality control of body fluid parameter sensors. Thereby an improved gas diffusion barrier is achieved without the issue of parasitic hydrogen generation upon piercing of the cover by an access probe.

Advantageously, the thickness of the gas diffusion barrier layer, such as a gas diffusion barrier layer made of aluminum oxide, may be from 40 nm to 60 nm, preferably 45 nm to 55 nm.

Further according to some embodiments of the sealed bag, the first polymer layer of the second layered material is made of a heat-sealable material. Thereby it is achieved that the cover may be attached to attachment portions of the peripheral walls by heat sealing techniques. Preferably, the attachment portions are arranged at the periphery of the opening. As mentioned above, heat sealing techniques allow for the reliable formation of mechanically stable and fluid tight seals. Preferably, the heat sealable material is a polyolefin, preferably polypropylene or polyethylene, more preferably polyethylene. This allows for a particularly reliable seal formation. In order to facilitate a heat sealing attachment of the cover over the opening in this way, the first polymer layer facing towards the joint is preferably made of a heat sealable material, whereas the second polymer layer facing away from the joint is not heat sealable—or at least has a melting temperature above the process temperatures to be applied for heat sealing of the first polymer layer. The heat-sealable materials involved in forming the joint thus have a melting temperature below the remaining layers of the first and/or second layered material.

Preferably according to some embodiments of the sealed bag, the second polymer layer of the second layered material is made of polyethylene terephthalate or polyamide, preferably polyamide.

Most preferably, a heat sealable first polymer layer of the second layered material is heat-sealed to the inner layer of the first layered material, which itself is made of a heat sealable material, such as polyethylene or polypropylene. When the cover is attached in this way to seal the opening in the peripheral walls of the bag, the first polymer layer of the cover is oriented facing in an outward direction away from the inner chamber of the bag, and the second polymer layer of the cover is facing in an inward direction towards the inner chamber of the bag and will be exposed to the reference fluid throughout a storage period. Therefore, preferably, the material of the second polymer layer is chosen to be compatible with the reference fluid, i.e. the material of the second polymer layer of the second layered material is chemically stable with respect to the reference fluid and does not cause contamination of the reference fluid.

As mentioned above, the first polymer layer may be made of a polyolefin, such as polypropylene or polyethylene. It is preferred that the first layer is made of polyethylene. It is also preferred that the first polymer layer is bi-axially orientated. In a preferred embodiment, the first polymer layer is bi-axially orientated polyethylene. Advantageously, the first polymer layer of the second layered material has a thickness from 70 μm to 90 μm, preferably from 75 μm to 85 μm.

The second polymer layer may be made of any suitable polymer. Examples of suitable polymer materials include polyolefin, polyester, polyurethane, polycarbonate and polyamide. Preferably, the second polymer layer is bi-axially orientated. Preferably, the second polymer layer is bi-axially orientated polyamide. The thickness of the second polymer layer of the second layered material may be from 10 μm to 20 μm, preferably 12 μm to 18 μm. The inclusion of this layer ensures good mechanical stability of the second layer material.

Further according to some embodiments of the sealed bag, the second layered material comprises at least a first additional polymer layer between the first and second polymer layers. Thereby the mechanical stability of the second layered material is enhanced. Further according to some embodiments of the sealed bag, the first gas barrier layer of the second layered material is attached to the first additional polymer layer. The first additional layer may thus act as a carrier layer providing mechanical support to the gas diffusion barrier layer, thereby facilitating a reliable production of the second layered material. The quality of the gas diffusion barrier layer of the second layered material can thus be improved, so as to reduce gas diffusion through the cover at the location of the opening.

Further according to some embodiments of the sealed bag, the second layered material further comprises a second gas barrier layer. Thereby, the gas diffusion barrier of the second layer is further enhanced, thus further reducing gas diffusion through the cover.

Further according to some embodiments of the sealed bag, the second gas barrier layer of the second layered material is made of aluminium oxide or silicon oxide, preferably aluminium oxide. As mentioned above, this material choice provides a surprisingly good gas diffusion barrier. An improved gas diffusion barrier is thus achieved without the issue of parasitic hydrogen generation upon piercing of the cover by an access probe.

Advantageously, the thickness of the second gas diffusion barrier layer is the same as the thickness of the first gas diffusion barrier layer, i.e. from 40 nm to 60 nm, preferably from 45 nm to 55 nm.

Further according to some embodiments of the sealed bag, the second layered material further comprises a second additional polymer layer between the first and second polymer layers. Thereby the mechanical stability of the second layered material is further enhanced. Further according to some embodiments of the sealed bag, the second gas barrier layer of the second layered material is attached to the second additional polymer layer. The second additional layer may thus act as a carrier layer providing mechanical support to the second gas diffusion barrier layer, thereby facilitating a reliable production of the second layered material. The quality of the gas diffusion barrier layer of the second layered material can thus be improved further, so as to reduce gas diffusion through the cover at the location of the opening.

Further according to some embodiments of the sealed bag, the first and/or second additional polymer layers of the second layered material are made of polyethylene terephthalate. Further according to some embodiments of the sealed bag, at least one of the layers composing the first layered material is a bi-axially oriented polymer, wherein further preferably the polymer is at least one of the above-mentioned types. Further according to some embodiments of the sealed bag, at least one of the layers composing the second layered material is a bi-axially oriented polymer, wherein further preferably the polymer is at least one of the above-mentioned types.

Advantageously, the first and second gas barrier layers are separated from each other by at least one of the additional polymer layers, i.e. by the first additional polymer layer, by the second additional polymer layer (if present), or by both the first and second additional polymer layers (if applicable). It is preferred that the first and second additional polymer layers are made from the same polymeric material. Preferably, that polymeric material is polyethylene terephthalate. It is preferred that the first and second additional polymer layers are bi-axially orientated, for example biaxially orientated polyethylene terephthalate. The thickness of the first and second additional polymer layers may be from 10 µm to 15 µm, preferably from 11 µm to 13 µm.

Further according to some embodiments of the sealed bag, the cover is attached to the peripheral wall around the opening from the inside of the bag. This embodiment is particularly advantageous in combination with embodiments having heat sealable materials on those faces of the first and/or second layered materials where the seal is formed. By using a heat sealing technique the use of glue may be avoided for attaching the cover to the peripheral walls, a potential source for contamination of the reference fluid is avoided. Other "glue-less" techniques for forming a sealed joint, such as ultrasonic welding, may be conceived by the skilled person for achieving the same effect in an equivalent manner.

Further according to some embodiments of the sealed bag, the cover is attached to an attachment portion of the peripheral wall at the periphery around the opening.

Further according to some embodiments of the sealed bag, the first and second layered materials are joined to each other with the inner layer of the first layered material in sealing engagement with the first polymer layer of the second layered material. Thereby a sealed, i.e. fluid-tight, joint between the cover and the first layered material is formed. Preferably, the joint is arranged in an edge region at the periphery of the opening.

Further according to some embodiments of the sealed bag, the reference fluid comprises at least one analyte selected from the group consisting of $CO_2$, $O_2$, $K^+$, $Na^+$, $Ca^{2+}$, $Cl^-$, glucose, lactate, haemoglobin, creatinine, creatine and urea. The reference fluid is typically an aqueous solution comprising a plurality of these analytes in calibrated concentrations. Depending on the calibration or quality control procedure to be performed, the reference fluid preferably comprises a combination of multiple components, such as two, three, four, or even more different analytes selected from the above list at pre-determined concentrations in calibrated amounts. The predetermined concentration may even be close to zero or equal to zero within explicitly or implicitly specified tolerances, as long as such a low concentration is also specified following a calibration procedure.

Advantageously according to some embodiments of the sealed bag, the reference fluid comprises creatinine and/or creatine. According to some embodiments, a creatinine concentration in the reference fluid is at least 200 µM, or at least 300 µM, or at least 400 µM. Further according to some embodiments, a creatine concentration in the reference fluid is at least 300 µM, or at least 400 µM, or at least 500 µM. Further advantageously according to some embodiments of the sealed bag, the reference fluid comprises oxygen. According to some embodiments, the reference fluid comprises oxygen at a pre-determined partial pressure ($pO_2$) of below 100 mmHg, below 50 mmHg, or below 30 mmHg; Alternatively according to some embodiments, the reference fluid comprises oxygen at a pre-determined partial pressure ($pO_2$) of at least 250 mmHg, or at least 300 mmHg, or at least 350 mmHg. A substantial deviation from "normal" partial pressure of oxygen of about 180 mmHg makes the calibration/QC system particularly sensitive to oxygen leakage (in or out depending on the partial pressure gradient), e.g. due to gas diffusion through the peripheral walls of a sealed bag. Use of a metallic gas diffusion barrier layer, such as made of aluminium, in the peripheral walls of a sealed bag for such a reference fluid may therefore be desirable. However, if the analysis system to be calibrated or quality controlled using the reference fluid at the same time has a sensor that is particularly sensitive to the generation of parasitic hydrogen, such as a high-sensitivity amperometric sensor like the creatine/creatinine sensor as discussed above, a sealed bag with an access port according embodiments of the invention is advantageous, in particular if the creatine/creatinine content of the reference fluid is relatively high, such as according to the above-cited ranges. A sealed bag according to the present invention is thus particularly useful for increasing the reliability of the calibration and/or quality control procedures when the reference fluid has a relatively low or relatively high oxygen concentration, as compared to air under normal storage, transport and/or operation conditions, and at the same time has relatively high concentrations of creatine and/or creatinine. The analogue also applies to glucose and lactate sensors, in particular high-sensitivity amperometric sensors for measuring glucose or lactate. Amperometric sensors with a sensitivity of above 0.1 pA/µM are typically considered to have high sensitivity. More specifically, amperometric glucose and lactate sensors with a sensitivity of at least 0.1 pA/µM, such as at least 1 pA/µM, such as at least 2 pA/µM are considered to have high sensitivity. Further specifically, amperometric creatine/creatinine sensors with a sensitivity of at least 30 pA/µM, such as at least 100 pA/µM, such as at least 200 pA/µM, are considered to have high sensitivity.

Advantageously according to some embodiments diffusion of oxygen through the first layered material is less than 0.1 $cm^3/m^2/24$ hrs/atm, preferably less than 0.01 $cm^3/m^2/24$ hrs/atm, preferably less than 0.001 $cm^3/m^2/24$ hrs/atm, as determined at room temperature 23 degree Celsius according to a Standard Test Method for Oxygen Gas Transmission Rate Through Plastic Film and Sheeting Using a Coulometric Sensor, such as according to ASTM D3985 in any version thereof, and in particular according to ASTM D3985-95 or alternatively according to ASTM D3985-05(2010)e.

Advantageously according to some embodiments diffusion of oxygen through the second layered material is less than 5 $cm^3/m^2/24$ hrs/atm, preferably less than 3 $cm^3/m^2/24$ hrs/atm, preferably less than 1 $cm^3/m^2/24$ hrs/atm, or less than 0.5 $cm^3/m^2/24$ hrs/atm, or less than 0.3 $cm^3/m^2/24$ hrs/atm, or even less than 0.1 $cm^3/m^2/24$ hrs/atm, as determined at room temperature 23° Celsius according to a Standard Test Method for Oxygen Gas Transmission Rate Through Plastic Film and Sheeting Using a Coulometric Sensor, such as according to ASTM D3985 in any version thereof, and in particular according to ASTM D3985-95 or alternatively according to ASTM D3985-05(2010)e.

Further according to some embodiments, the sealed bag may further comprise a sealing element which is adapted for being pierced by an access probe, such as a needle. The sealing element is preferably provided on the outside of the bag, i.e. on the outer polymer layer. The sealing element prevents leakage between the bag and the access probe when the access probe has penetrated the bag. When the sealing element is provided on the exterior of the bag and an access probe passes through the sealing element, the movement of the access probe during piercing of the bag forces the sealing element towards the exterior wall (i.e. the outer polymer layer) of the bag and provides an even tighter sealing.

Advantageously according to some embodiments, the sealing element may have a shape to make it possible to obtain a tight sealing between the access probe and the wall of the bag, and the sealing element preferably has a substantially cylindrical form that encloses the access probe. The sealing element also has a flange that abuts against the wall of the bag at the access location. To obtain the desired flexibility, the sealing element is preferably made from a rubber material e.g. butyl rubber. In case of more access probes and more bags being placed in a container, more sealing elements are required. The sealing elements may be mutually connected to facilitate mounting in the container.

The sealing element is attached to the bag at the location where the access probe pierces the bag, and the sealing element subsequently, by interaction with the access probe and the wall (i.e. the outer polymer layer) of the bag, seals the opening produced by the piercing. The sealing element may be attached to the outer polymer layer of the bag by means of glue or by melting of the material of the sealing element and the bag. The glue or melted material may serve as additional sealing material and provide a tighter sealing. A seal may be obtained between the sealing element and the first layered material, preferably at the periphery of the opening in the peripheral walls; between the sealing element and the second layered material at or around the location of piercing; and by having the sealing element abut both the first and second layered materials at the location of the access port.

In an alternative preferred embodiment of the bag, according to the invention, the sealing element is attached to an access probe. In this embodiment the sealing element follows the access probe and the sealing element seals the produced opening by interaction with the access probe and the outer polymer layer of the bag. Leakage after piercing due to an imprecise placement of the sealing element on the outer surface of the bag may be avoided because the sealing element is placed on the outer surface of the bag by the access probe during piercing. The sealing element may be connected to the access probe simply by friction.

In a further alternative preferred embodiment, the sealing element is attached in a frame-like structure between the access probe and the outer polymer layer of the bag, optionally abutting the outer polymer layer of the bag. The sealing element is then attached in such a way that the access probe may easily enter the sealing element, penetrate the bag and simultaneously press the sealing element towards the outer polymer layer of the bag. The frame-like structure for holding the sealing element is preferably attached within a box-like structure holding one or more bags according to the invention.

Advantageously according to some embodiments, the opening in the peripheral walls is formed by simply punching a hole through the first layered material at the location designated for access. Such a simple process has advantages e.g. with respect to easy and cheap production. However, simply punching a hole leaves an inner layer or layers of the first layered material, such as an aluminium layer forming a gas diffusion barrier, exposed at the edge of the punched hole. In this case it is particularly advantageous to attach the cover to the peripheral walls from the inside of the sealed bag, i.e. from the side contacting the reference fluid. Thereby, contact between the reference fluid and the exposed inner layer or layers is avoided, which otherwise would cause generation of parasitic hydrogen by oxidation of the inner layer or layers. Further according to some embodiments, an external sealing element, such as a sealing element made from an elastic material like rubber, is provided as discussed above. The sealing element is generally for preventing contamination of the reference fluid due to leakage of outside gases (or fluids) into the reference fluid at the point of penetration of the access probe into the sealed bag. Furthermore, the sealing element is for preventing the leakage of reference fluid out of the reference fluid handling system at this point of access. In the present case, where the sealed access port is formed by punching a hole into the peripheral walls and sealing the hole by a cover attached from the inside, the sealing element has a yet further, synergistic advantage in that it may be formed so as to also prevent reference fluid from reaching the above-mentioned exposed edge of the punched hole. To that end, the sealing element is shaped and dimensioned so as to provide a seal at least between the material of the sealing element and the second layered material around the point where an access probe penetrates the cover.

The sealed bag may further comprise a support element attached to an inner surface of the bag. Preferably, the support element and the inner surface of the bag (i.e. the inner polymer layer) are made of the same material. Thus, the support element is preferably made from a polyolefin which is preferably polyethylene. When the support element and the inner surface are made from the same material, they may be easily joined by e.g. melting or gluing.

The support element is adapted to support the walls of the bag, e.g. during mounting in a container (described in more detail below). The support element may also serve as a support for the sealing element when the access probe penetrates the bag, whereby a very tight sealing between the sealing element and the bag is obtained.

The support element is preferably completely enclosed in the bag without penetrating the walls of the bag. More preferably, the support element is attached to an inner surface portion of the bag. The support element may be a longitudinally bar-like element having dimensions to make it fit within a bag without penetrating the walls of the bag. Moreover, the support element preferably has rounded ends to avoid damaging of the walls of the bag.

The support element may conveniently comprise at least one passage adapted to interact with a penetrating access probe. Preferably an inner wall in the support element forms the passage which is substantially non-deformable. The passage preferably has a diameter that exceeds the diameter of the access probe, which allows the access probe to enter the passage easily. The passage typically has a diameter being 2% to 10% larger than the diameter of the access probe. Consequently, the support element has no sealing effect. However, the support element with the passage provides for the sealing element being placed in close contact with the exterior wall of the bag (i.e. in contact with the outer polymer layer), while the interior wall (i.e. inner polymer layer) is supported by the support element in such a way that the piercing access probe forces the sealing element towards the outer wall of the bag.

The support element may comprise at least two through-going holes or bores arranged at opposite ends of the support element. This makes the support element substantially symmetric which facilitates the mounting in the bag.

Alternatively, the support element may comprise a plurality of through-going holes or bores at the respective opposite ends of the support element. This embodiment also facilitates the mounting and provides more freedom for placing the point for piercing.

In a preferred embodiment, one or both ends of the support element are provided with tongues. The one or two tongues are adapted to be cast into one or two welded joints of the bag. The embodiment provides for a more stable attachment of the support element to the bag and reduces the risk of breaching the walls of the bag due to movement of the support element, e.g. during transport of the bag.

The dimensions of the support element naturally depends on the specific use, however, a preferred length is from about 10 cm to about 22 cm, more preferably from about 13 cm to about 18 cm. Preferably the support element has a cross sectional area in the range of about 0.5 $cm^2$ to about 3 $cm^2$, more preferably from about 0.7 $cm^2$ to about 1.5 $cm^2$. The cross section of the support element may be substantially circular, oval, square, rectangular or any other desired shape.

Preferably, the opening is aligned with the passage through the support element. Aligning the opening with the passage means aligning the access location with the passage through the support element. Further preferably, the cover is arranged between the support element and the peripheral wall around the opening. During piercing of the bag, the support element has the function of supporting the bag around the location of piercing, thereby facilitating a more controlled penetration of the membrane material sealing the bag. Typically, a transverse dimension of the opening is larger than the diameter of the passage. The passage is thus only covered by the cover, thereby ensuring that the access probe pierces the second layered material and not the first layered material. Furthermore, by aligning the access location with the passage, the support element can interact with the access probe and the sealing element to obtain a very tight seal.

Advantageously according to some embodiments of the sealed bag, the bag is envelope shaped with a first edge defining a longitudinal direction of the bag. Preferably, the opening is arranged at the first edge of the bag. When empty, the envelope has typically a flattened shape with a longitudinal edge defining a longitudinal direction of the envelope, and with a transverse edge defining a transverse direction perpendicular to the longitudinal direction, the longitudinal and transverse directions spanning a principal plane of the envelope. When filled, the walls of the envelope may bulge out, e.g. like a cushion or like a pressurized flexible tube, wherein a thickness of the envelope is defined in a direction perpendicular to the principal plane of the envelope.

According to a further aspect of the invention, a reference bag assembly comprises a sealed bag according to any of the embodiments of the invention, and an access probe adapted for insertion into the sealed bag through the access port by piercing the second layered material, the access probe being further adapted for withdrawing the reference liquid there through. Preferably, a reference fluid bag assembly comprises: a sealed bag adapted for being pierced by an access probe for withdrawal of the reference fluid; an access system; wherein the access system comprises a sealing element on the outside of the bag, the sealing element preventing any leakage between the bag and the access probe when the access probe has penetrated the bag, and a longitudinal support element provided inside the bag extending essentially parallel to an edge of the bag and being adapted to support the bag when the bag is penetrated by the access probe.

According to a yet further aspect of the invention, a container is adapted for providing an analysis instrument for measuring parameters of a body fluid with a plurality of reference fluids for sensor calibration and/or sensor quality control, the container comprising at least one bag assembly with a sealed bag according to any of the embodiments of the invention. The sealed bag is for use in a cassette, or container, compatible with an analysis instrument using a cassette-based reference fluid system. Such a cassette typically includes a plurality of different reference fluids in sealed bags provided as a kit, wherein the kit further comprises access probes and cooperating sealing means for ensuring that the reference fluids also during withdrawal are shielded from environmental influences so as to not compromise the calibration and/or quality control procedures. An advantageous example of such a cassette, for use in a cassette-based system is e.g. disclosed in U.S. Pat. No. 9,101,936.

The sealed bags according to the invention may thus be provided in a container. The container is preferably a box-like container having a lid and comprising one or more bags and wherein at least one of the bags contains a reference fluid for the calibration or quality control of a creatine/creatinine sensor and/or a glucose sensor and/or a lactate sensor. The container is conveniently made from a plastic material e.g. acrylonitrile-butadiene-styrene (ABS), polyethylene (PE) or polycarbonate (PC). The container e.g. includes 6-12 sealed bags. Often, one or more of the bags may contain waste or other calibration or rinse fluids. As mentioned above, the bag is preferably in the form of an envelope, which makes it easier to fit more bags into a container. Moreover, the shape of the envelope also provides for an optimal utilization of the space inside the container.

According to a further aspect, the invention also relates to a multiple sensor assembly adapted for calibration and/or quality control, the sensor assembly including at least a creatine/creatinine sensor, and/or a glucose sensor, and/or a lactate sensor. The assembly comprises a sealed bag as described above, along with an access system having an access probe, and a multiple sensor assembly including a creatine and/or creatinine sensor, and/or a glucose sensor, and/or a lactate sensor. The access system comprises a sealing element and a longitudinal support element as previously described. For example, the sealing element of the access system is provided on the exterior of the sealed bag and prevents any leakage between the bag and an access probe when the access probe has penetrated the bag. The longitudinal support element provided inside the bag extends essentially parallel to an edge of the bag and is adapted to support the bag when the bag is penetrated by the access probe.

BRIEF DESCRIPTION OF THE DRAWINGS

Preferred embodiments of the invention will be described in more detail in connection with the appended drawings, which show schematically in FIG. 1 an embodiment of a sealed bag with an access system.

DETAILED DESCRIPTION OF PREFERRED EMBODIMENTS

Figure 1:
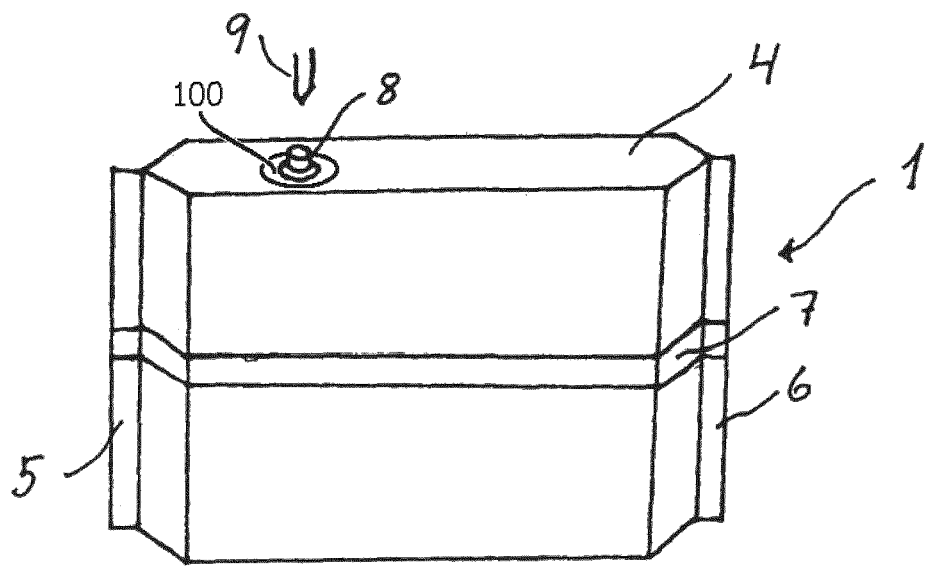

FIG. 1 shows a simplified depiction of a sealed bag 4 according to the invention, having an access system. The sealed bag 4 with access system is a bag assembly 1. The bag assembly 1 comprises a sealed bag 4 shaped as an envelope and containing a reference fluid and a support element (not visible). The sealed bag 4 has heat-sealed joints 5, 6 at the end-parts and along the side 7 of the bag 4. The bag has an access port 100 formed as an opening in the peripheral walls of the bag. The opening is sealed by a cover. The access port 100 defines an access location where an access probe 9 may penetrate the bag for withdrawing the reference fluid. The cover is made of materials that are resistant to oxidation by the reference fluid even when broken, e.g. by an access probe 9. Thereby the issue of parasitic hydrogen generation is overcome. The bag assembly 1 is furthermore provided with a sealing element 8 capable of sealing an opening in the bag pierced by an access probe 9 as indicated in the upper part of the figure. The sealing element 8 is placed at the access location defined by the access port 100.

The access probe 9 may be connected to a lid or other element (not shown) of a container. The sealing element 8 is made from butyl rubber and the access probe is made from ABS in this specific embodiment.

Figure 2:
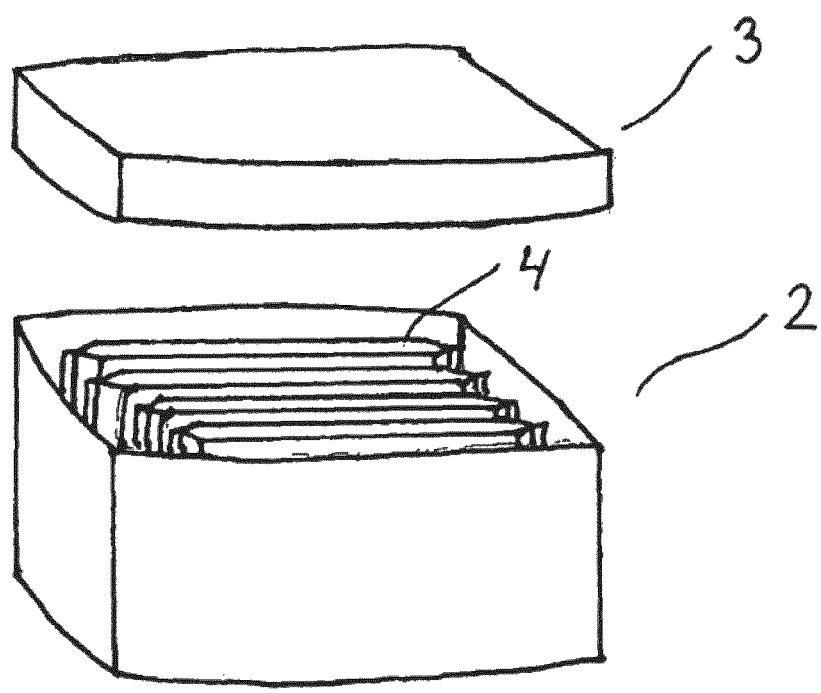
FIG. 2 a container with a plurality of sealed bags according to the embodiment of FIG. 1.

FIG. 2 depicts a container 2 in the shape of a box-like member and lid 3. The box-like member and the lid 3 is made from ABS. The box-like member contains several sealed bags 4 of which at least one is a sealed bag 4 according to the invention. The lid 3 may comprise access probes (not shown) for piercing the sealed bags 4 and further devices (not shown) for connecting the sealed bags 4 to a sample chamber of an analysis instrument with e.g. a creatine and/or creatinine sensor, a glucose sensor, and/or a lactate sensor.

Figure 3:
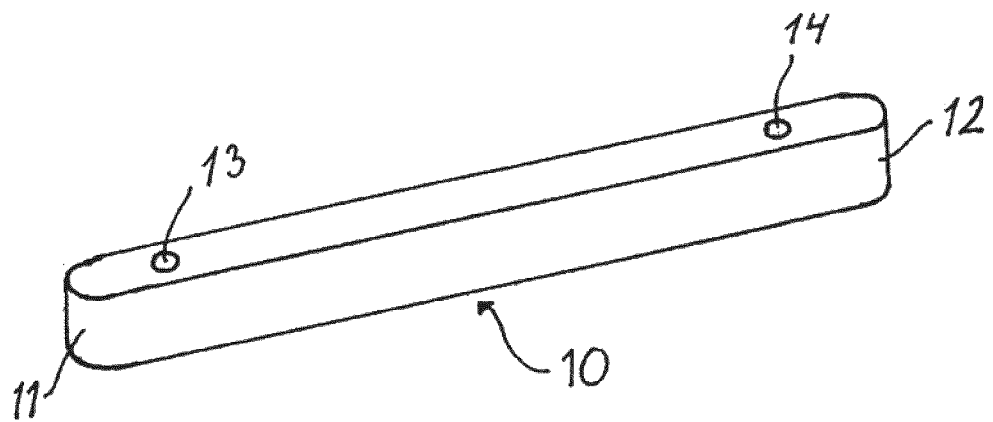
FIG. 3 a support element for use with a sealed bag according to some embodiments of the invention.

FIG. 3 depicts a support element 10 for use in a bag assembly 1. The support element 10 is shaped as a longitudinal element with rounded ends 11, 12. Furthermore, the support element 10 is equipped with passages in the form of holes 13, 14 positioned symmetrically with respect to each end. The holes 13, 14 are intended to receive an access probe for withdrawal of reference fluid from a sealed bag. Indeed, one hole would be sufficient, however, the two holes 13, 14 positioned symmetrically with respect to each end of the support element 10 facilitate the production and mounting of the support element 10.

Figure 4:
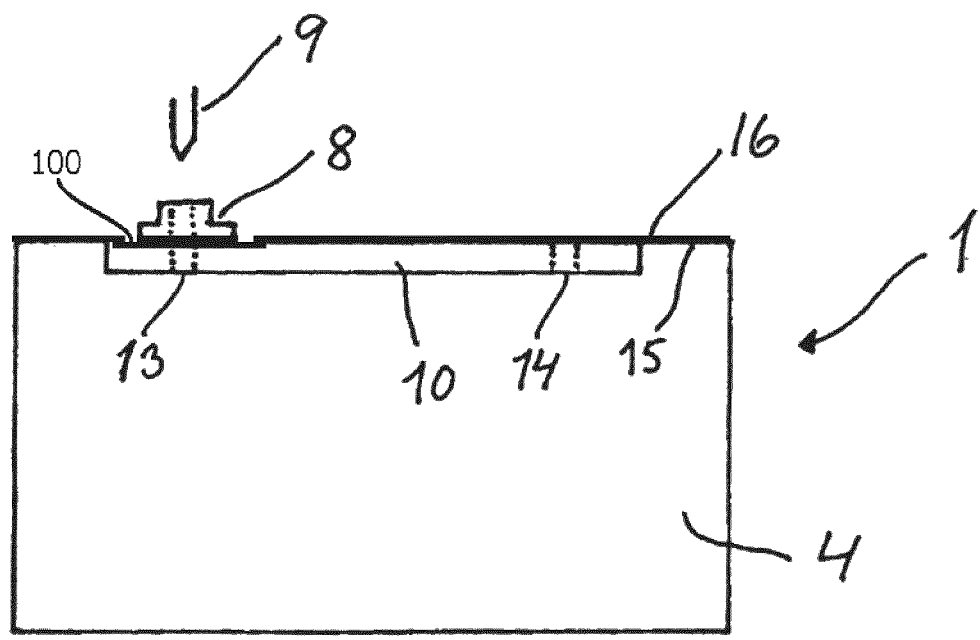
FIG. 4 a cross-sectional view of a sealed bag according to some embodiments of the invention, with a support element and a sealing element.

In FIG. 4, a support element 10 is mounted in the interior of a sealed bag 4. The support element 10 is mounted on the inner wall 15 of the sealed bag 4, such that it is in contact with the inner polymer layer. The bag has an access port 100 formed as an opening in the peripheral walls, which is sealed by a cover as described above. On the outer wall 16 of the sealed bag 4 is mounted a sealing element 8 at the location of the hole 13 in the support element 10.

Figure 5:
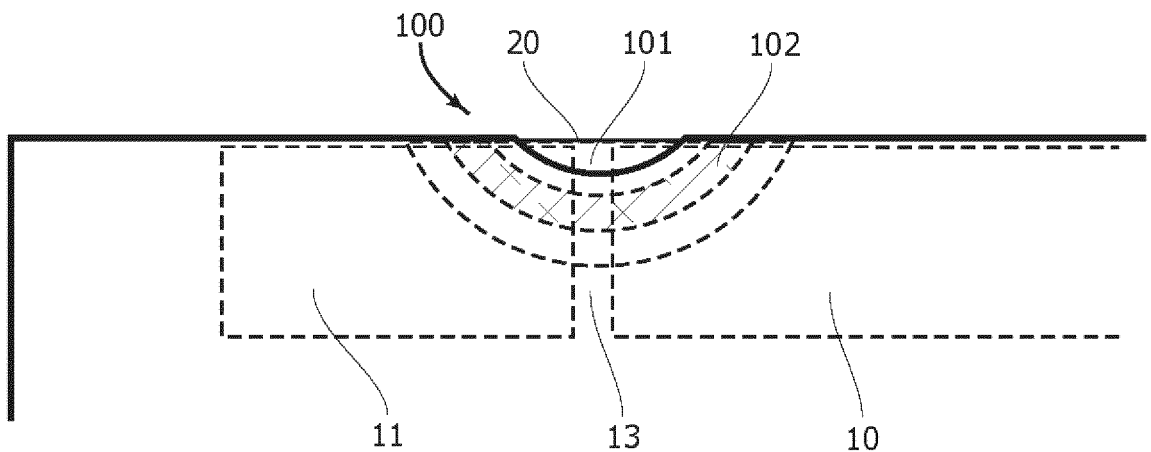
FIG. 5 a side elevation detail of a sealed bag with an access port according to one embodiment.
Figure 6:
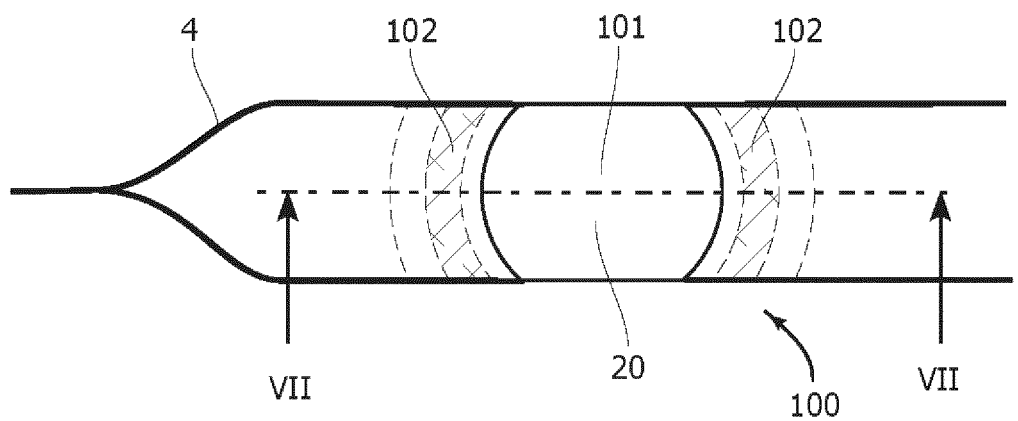
FIG. 6 a top elevation detail of the sealed bag of FIG. 5.
Figure 7:
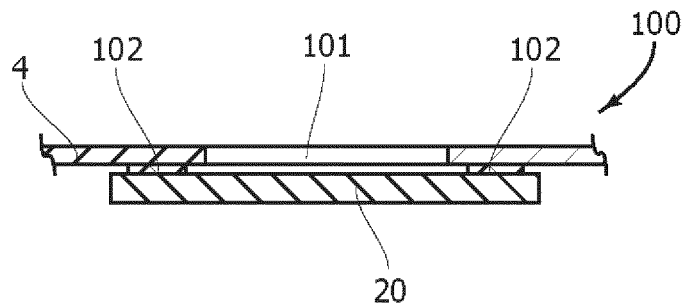
FIG. 7 a cross-sectional detail of the sealed bag of FIG. 6 along line VII-VII.

Details of the access port 100 are now explained with reference to the schematic drawings in FIGS. 5-7. An envelope shaped sealed bag 4 has peripheral walls made of a first layered material. The peripheral walls have an opening, here shown as a circular opening 101, which is sealed by a cover 20 attached to the peripheral walls from the inside. The cover is made of a second layered material. The second layered material, including any internal layers of the second layered material, is made of materials that are more resistant to oxidation by the reference fluid than the first layered material. A welding seam 102 is formed between the cover 20 and the peripheral walls of the bag 4 at attachment portions thereof, thereby sealing the cover 20 to the peripheral walls. A support element 10 may be attached to an inner surface of the peripheral walls of the bag 4 as described before. A first end 11 of the support element has a passage 13 adapted for receiving and guiding an access probe there through when the access probe pierces the bag 4. The passage 13 is aligned with the opening 101 of the access port 100.

Figure 8:
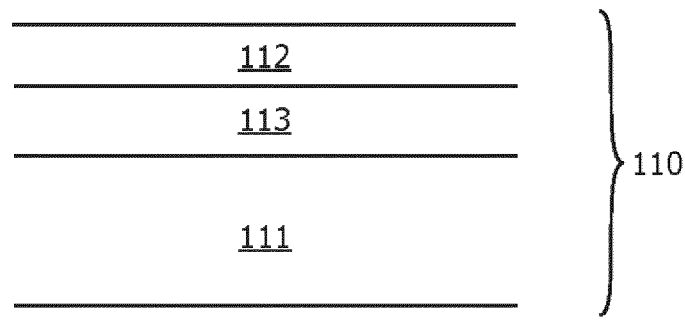
FIG. 8 cross-sectional detail of a first layered material according to one embodiment; and in FIG. 9 a cross-sectional detail of a second layered material according to one embodiment.

FIG. 8 shows one embodiment of a first layered material 110 for forming the peripheral walls of the sealed bag 4. The first layered material 110 has an inner polymer layer 111 adapted for contact with the reference fluid, an outer polymer layer 112 adapted for forming an outside face of the bag 4, and a gas barrier layer 113 arranged between the inner polymer layer 111 and the outer polymer layer 112. The inner polymer layer 111 of the first layered material 110 is made of a heat-sealable material, such as polyethylene (PE). The outer polymer layer 112 of the first layered material 110 is made of polyethylene terephthalate (PETP) or polyamide (PA). The gas diffusion barrier layer 113 of the first layered material is typically made of aluminium (Al). While the layer 113 provides a reliable gas diffusion barrier, it may oxidise when exposed to the reference fluid, e.g. upon being pierced by an access probe for withdrawing the reference fluid. As a consequence, hydrogen is produced which may cause interference with calibration and quality control procedures. To avoid such interference, the access port 100 features a cover 20 made of a second layered material that is more resistant to oxidation by the reference fluid than the first layered material.

Figure 9:
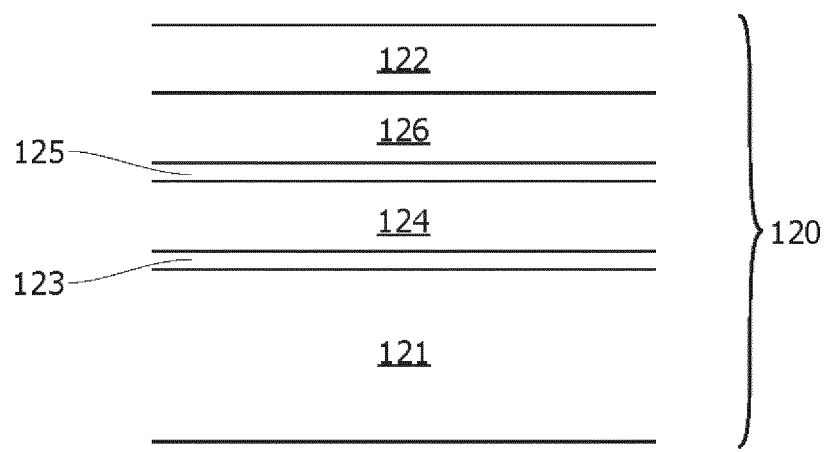

FIG. 9 shows one embodiment of a second layered material 120 for forming the cover 20 of the access port 100. The second layered material 120 has a first polymer layer 121, a second polymer layer 122, and a first gas barrier layer 123 between the first polymer layer 121 and the second polymer layer 122. The first polymer layer 121 of the second layered material 120 is made of a heat-sealable material, such as polyethylene (PE). The second polymer layer 122 of the second layered material 120 is made of polyamide (PA). The first gas barrier layer 123 of the second layered material 120 is made of aluminium oxide (AlOx). The second layered material 120 further comprises a first additional polymer layer 124 between the first polymer layer 121 and the second polymer layer 122. The first additional polymer layer 124 acts as a support layer for the first gas barrier layer 123. The second layered material 120 further comprises a second gas barrier layer 125 between the first polymer layer 121 and the second polymer layer 122, which is separated from the first gas barrier 123 layer by the first additional polymer layer 124. The second gas barrier layer 125 of the second layered material 120 is made of aluminium oxide (AlOx). The second layered material 120 further comprises a second additional polymer layer 126 between the first polymer layer 121 and the second polymer layer 122. The second additional polymer layer 126 acts as a support layer for the second gas barrier layer 125. The first and second additional polymer layers 124, 126 are made of polyethylene terephthalate (PETP). The second layered material 120 thus has the following layer sequence going from the first polymer layer 121 to the second polymer layer 122: first polymer layer 121; first gas barrier layer 123; first additional polymer layer 124, second gas barrier layer 125, second additional polymer layer 126; second polymer layer 122. The gas barrier layers 123, 125 of the second layered material 120 are made of aluminium oxide (AlOx), which is more resistant to oxidation by aqueous reference solutions than aluminium (Al), which is used for the gas barrier 113 in the first layered material 110.

The polymer layers 111, 112 of the first layered material 110 and the polymer layers 121, 122, 124, 126 of the second layered material 120 are made of bi-axial polymer material.

EXAMPLE 1

According to this example, a first layered material is provided. The first layered material has a layer sequence as described above with respect to FIG. 8, and layer thicknesses and materials as follows from Table 1, wherein adhesive layers for binding the layers together, typically polyurethane based adhesive layers, are omitted:

TABLE 1

| Layer | Material | Thickness |
| --- | --- | --- |
| inner polymer | PE | 80 μm |
| gas barrier | Al | 9 μm |
| outer polymer | PETP | 12 μm |

EXAMPLE 2

According to this example, a second layered material is provided. The second layered material has a layer sequence as described above with respect to FIG. 9, and layer thicknesses and materials as follows from Table 2, wherein adhesive layers for binding the layers together, typically polyurethane based adhesive layers, are omitted:

TABLE 2

| Layer | Material | Thickness |
| --- | --- | --- |
| first polymer | PE | 80 μm |
| first gas barrier | AlOx | 50 nm |
| first additional polymer | PETP | 12 μm |
| second gas barrier | AlOx | 50 nm |
| second additional polymer | PETP | 12 μm |
| outer polymer | PA | 15 μm |

EXAMPLE 3

According to this example, a container with a plurality of reference fluid bag assemblies is disclosed. The container may be a container as schematically shown in FIG. 2. The container is for providing a plurality of different reference fluids for the calibration and/or quality control procedures to be performed at regular intervals in an instrument for the analysis of body fluids, such as blood or urine, with respect to different parameters. The instrument is typically one that is adapted to measure different parameters simultaneously on the same sample using an array of sensors including electrochemical sensors, such as amperometric sensors, which are integrated within the same sample chamber. The different reference fluids are contained in envelope shaped sealed bags. The bags remain sealed for safe storage and transportation. Upon installation, the sealed membranes forming the bags are perforated by means of cooperating access probes for allowing withdrawal of the respective reference fluids from the bag. Different reference fluids may be provided in the same cassette container, wherein each reference fluid is contained in its own sealed bag placed at a specified position in the cassette container. At least one of the reference fluids is provided in a sealed bag according to an embodiment of the invention with an access port formed by an opening in a first layered material defining peripheral walls, wherein the opening is sealed by a cover of a second layered material, and wherein the second layered material is more resistant to oxidation by the reference fluid than the first layered material. For example, the reference fluid may have a relatively high content of creatinine of above 300 μM, a relatively high content of creatine of above 300 μM, and a relatively low content of oxygen with a partial pressure of between 0 mmHg and 20 mmHg.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A sealed bag containing a reference fluid for the calibration or quality control of a sensor element for measuring body fluid parameters, the bag comprising:
   peripheral walls of a first layered material; and
   an access port formed by an opening in the first layered material,
   wherein the opening is sealed by a cover of a second layered material, the second layered material being more resistant to oxidation by the reference fluid than the first layered material, and
   wherein the reference fluid comprises at least one analyte selected from the group consisting of $CO_2$, $O_2$, $K^+$, $Na^+$, $Ca^{2+}$, $Cl^-$, glucose, lactate, haemoglobin, creatinine, creatine, and urea.

2. The sealed bag according to claim 1, wherein the first layered material comprises an inner polymer layer in contact with the reference fluid, an outer polymer layer, and a gas barrier layer between the inner and outer polymer layers.

3. The sealed bag according to claim 2, wherein the gas barrier layer of the first layered material is made of aluminum.

4. The sealed bag according to claim 1, wherein the inner polymer layer of the first layered material is made of a heat-sealable material.

5. The sealed bag according to claim 1, wherein an inner polymer layer of the first layered material is made of polyolefin.

6. The sealed bag according to claim 1, wherein an outer polymer layer of the first layered material is made of polyethylene terephthalate or polyamide.

7. The sealed bag according to claim 1, wherein the second layered material comprises at least a first polymer layer, a second polymer layer, and a first gas barrier layer between the first and second polymer layers.

8. The sealed bag according to claim 7, wherein the first gas barrier layer of the second layered material is made of aluminum oxide or silicon oxide.

9. The sealed bag according to claim 7, wherein the first polymer layer of the second layered material is made of a heat-sealable material.

10. The sealed bag according to claim 7, wherein the first polymer layer of the second layered material is made of polyolefin.

11. The sealed bag according to claim 7, wherein the second polymer layer of the second layered material is made of polyethylene terephthalate or polyamide.

12. The sealed bag according to claim 7, wherein the second layered material comprises at least a first additional polymer layer between the first and second polymer layers.

13. The sealed bag according to claim 12, wherein the second layered material further comprises a second additional polymer layer between the first and second polymer layers.

14. The sealed bag according to claim 12, wherein the first and/or second additional polymer layers of the second layered material are made of polyethylene terephthalate.

15. The sealed bag according to claim 7, wherein the second layered material further comprises a second gas barrier layer.

16. The sealed bag according to claim 15, wherein the second gas barrier layer of the second layered material is made of aluminum oxide or silicon oxide.

17. The sealed bag according to claim 1, wherein at least one of the layers composing the first layered material is a bi-axially oriented polymer.

18. The sealed bag according to claim 1, wherein at least one of the layers composing the second layered material is a bi-axially oriented polymer.

19. The sealed bag according to claim 1, wherein the cover is attached to the peripheral wall from the inside of the bag.

20. The sealed bag according to claim 1, wherein the cover is attached to an attachment portion of the peripheral wall at the periphery around the opening.

21. The sealed bag according to claim 1, wherein the first and second layered materials are joined to each other with the inner polymer layer of the first layered material in sealing engagement with the first polymer layer of the second layered material.

22. The sealed bag according to claim 1, wherein the reference fluid comprises creatinine and/or creatine.

23. The sealed bag according to claim 1, wherein the reference fluid comprises oxygen.

24. The sealed bag according to claim 1, further comprising a sealing element adapted for being pierced by an access probe.

25. The sealed bag according to claim 1, further comprising a support element attached to an inner surface of the bag.

26. The sealed bag according to claim 25, wherein the support element and the inner surface of the bag are made from the same material.

27. The sealed bag according to claim 25, wherein the support element comprises at least one passage for receiving an access probe.

28. The sealed bag according to claim 27, wherein the opening is aligned with the passage through the support element.

29. The sealed bag according to claim 25, wherein the cover is arranged between the support element and the peripheral wall around the opening.

30. A reference fluid bag assembly comprising a sealed bag according to claim 1, and an access probe adapted for insertion into the sealed bag through the access port by piercing the second layered material, the access probe being further adapted for withdrawing the reference liquid there through.

31. A container adapted for providing an analysis instrument for measuring parameters of a body fluid with a plurality of reference fluids for sensor calibration and/or sensor quality control, the container comprising at least one bag assembly according to claim 30.

* * * * *